(12) United States Patent
Madden et al.

(10) Patent No.: US 7,905,785 B2
(45) Date of Patent: Mar. 15, 2011

(54) SEALING ASSEMBLY

(75) Inventors: Michael Vincent Madden, Chapel Hill, NC (US); Andrew Patrick Gregory, Beeston (GB); Noel W. Sutton, Auburn Hills, MI (US); Shen-Ling Allen Wang, Northville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 567 days.

(21) Appl. No.: 11/957,600

(22) Filed: Dec. 17, 2007

(65) Prior Publication Data
US 2008/0146355 A1 Jun. 19, 2008

Related U.S. Application Data

(60) Provisional application No. 60/870,515, filed on Dec. 18, 2006.

(51) Int. Cl.
*F16D 3/84* (2006.01)
(52) U.S. Cl. .......................... 464/15; 464/170; 464/906
(58) Field of Classification Search .................. 464/15, 464/111, 140–146, 170, 905, 906; 184/88.2, 184/89
See application file for complete search history.

(56) References Cited

U.S. PATENT DOCUMENTS

| 782,640 | A | * | 2/1905 | Barry | 184/89 X |
|---|---|---|---|---|---|
| 3,287,934 | A | * | 11/1966 | Asher | 464/146 |
| 4,319,467 | A | * | 3/1982 | Hegler et al. | 464/170 X |
| 4,356,930 | A | | 11/1982 | Roper | |
| 5,647,801 | A | | 7/1997 | Jacob | |
| 6,203,441 | B1 | * | 3/2001 | Iarrera | 464/906 |
| 6,699,129 | B2 | | 3/2004 | Wang | |
| 6,793,581 | B2 | | 9/2004 | Meyer et al. | |
| 2003/0127908 | A1 | * | 7/2003 | Lyon et al. | |
| 2005/0153782 | A1 | * | 7/2005 | Jacob et al. | 464/145 |
| 2006/0063597 | A1 | | 3/2006 | Cermak et al. | |

* cited by examiner

*Primary Examiner* — Greg Binda
(74) *Attorney, Agent, or Firm* — Jennifer M. Brumbaugh; Rader, Fishman & Grauer PLLC (57) ABSTRACT

An embodiment of a constant velocity joint includes a first rotational member having a generally cylindrical surface. The generally cylindrical surface is defined, at least in part, by a groove portion. The constant velocity joint further includes a grease cover selectively positioned adjacent the first rotational member. An edge portion of the grease cover is positioned within the groove to at least partially retain the grease cover in a desired position.

9 Claims, 6 Drawing Sheets

SEALING ASSEMBLY

TECHNICAL FIELD

The present invention generally relates to constant velocity joints and specifically to grease covers therefore.

BACKGROUND

Constant velocity joints (CV joints) are common components in vehicles. Constant velocity joints are often employed where transmission of a constant velocity rotary motion is desired or required. CV joints are typically greased or otherwise lubricated for the life of the component. The joints are sealed to retain the grease or lubricant inside the joint while keeping contaminants and foreign matter, such as water and dirt, out of the joint. Moreover, a sealing boot, which may be made of rubber, thermoplastic, silicone material, or the like, usually encloses annular portions at an axial end of the CV joints with a shaft interposed therethrough. The opposing axial end may also be enclosed with a grease cover to seal the CV joint from contaminants.

During operation, a CV joint may create excess internal pressures in the inner chamber of the joint. In such instances, it is often desirable to vent pressurized gases from the chamber of the joint to the outer atmosphere to reduce the internal temperature of the joint. This function can prevent undesirable pressure build-up during operation of the joint that could damage or compromise components such as the sealing boot. Consequently, many CV joints include a vent. Examples of known vents include a small hole in the center of the grease cap. However, this venting technique may allow an unwanted release of the grease or lubricant.

Figure 1:
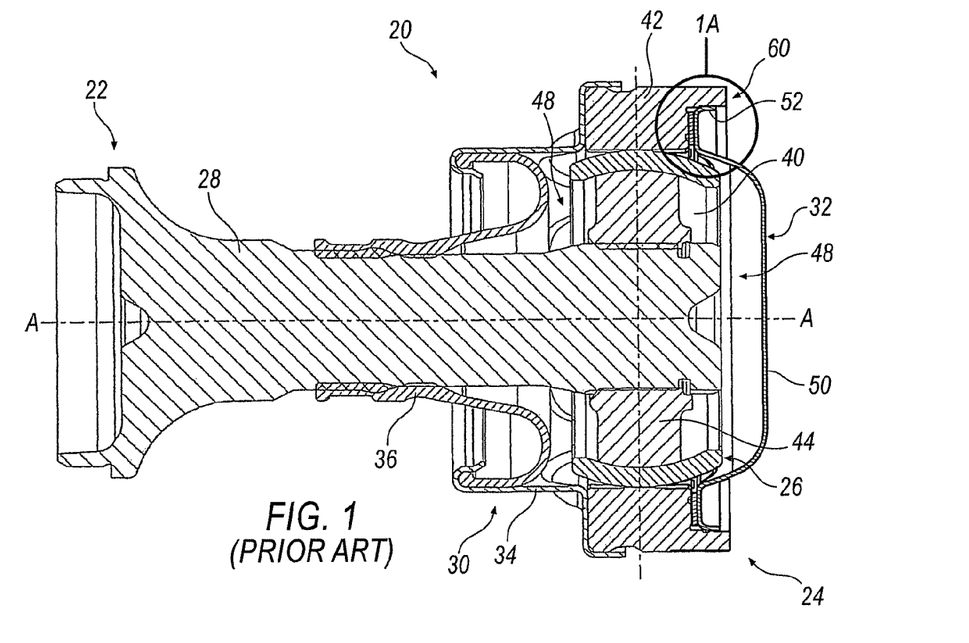
FIG. 1 is a sectional view of a constant velocity joint.

FIG. 1 illustrates a CV joint 20 having a central axis A-A. CV joint 20 includes driven end 22 and a driving end 24. CV joint 20 further includes a joint assembly 26 coupled to a shaft 28 with a boot cover assembly 30 connected therebetween. CV joint 20 further includes a grease cover 32 that seals the driving end 24. Boot cover assembly 30 includes a metal cover 34 and a flexible boot 36. A portion of metal cover 34 is crimped onto boot 36 for attachment thereto. Boot cover assembly 30 and grease cover 32 protect the moving parts of CV joint 20 during operation by retaining the grease or lubricant inside the joint while keeping contaminants and foreign matter, such as water and dirt, out of the joint assembly 26.

The grease cover 32 may include a vent valve aperture to accommodate a vent valve (not shown). The joint assembly 26 includes a cage 40, a first rotational member or outer race 42, a second rotational member or inner race 44, and a plurality of balls (not shown). The cage 40 retains the balls between the first rotational member 42 and the second rotational member 44 in a generally equally spaced circumferential orientation. The shaft 28 is splined to second rotational member 44 to allow axial movement therebetween.

Collectively, at least the shaft 28, boot cover assembly 30, first rotational member 42, and the grease cover 32 form a joint chamber 48. Joint chamber 48 contains grease or other lubricant (not shown) for lubrication between cage 40, first rotational member 42, second rotational member 44, and the balls.

Figure 1A:
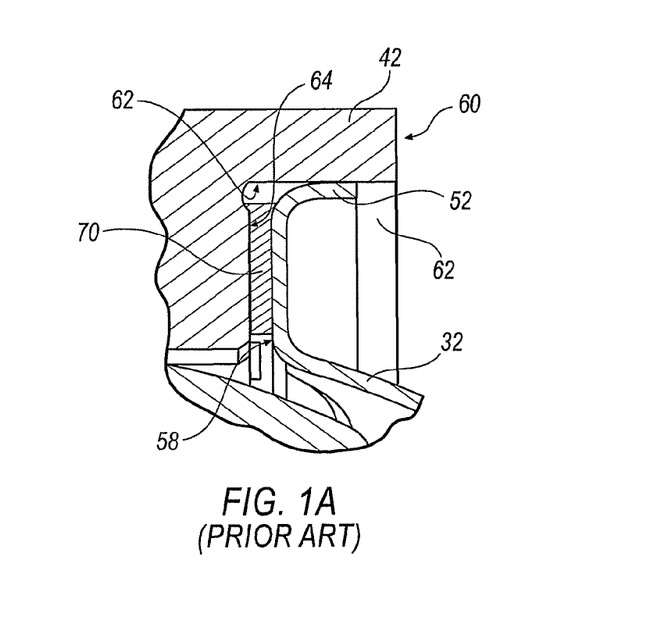
FIG. 1A is an enlarged view of area 1A of FIG. 1.

The grease cover 32 has a generally circular body 50 defined, at least in part, by a peripheral edge 52 and a generally annular sealing surface 58, as best seen in FIG. 1A. The first rotational member 42 has a grease cover end 60 having a generally cylindrical inner surface 62 and a generally annular mating surface 64. A gasket 70 is interposed between the sealing surface 58 of the grease cover 32 and the mating surface 64 of the first rotational member 42.

During vehicle operation, CV joints 20 are typically heated due to the rotation and resulting friction between moving parts. After vehicle operation, the pressure within the joint chamber 48 typically increases due to the heat, and the lubricants are typically softened and have a lower viscosity due to the heat. The grease cover 32 is therefore required to seal the joint chamber 48 at varying operational temperatures and pressures.

Typically, the grease cover 32 is press fit into the first rotational member 42 by providing an interference fit between the inner surface 62 and the peripheral edge 52. Thus, the force required to press fit the grease cover into the inner surface 62 defines the compressive force on the gasket 70. However, the expansion force generated by the gasket 70 acts against the retention of the grease cover 32 with the first rotational member 42.

Another difficulty may arise when the gasket 70 is misaligned and not in an expected position. This misalignment may include portions of the gasket 70 not being positioned between the surface 58 of the grease cover 32 and the mating surface 64 of the first rotational member 42, and/or portions of the gasket 70 being folded, providing a double thickness between the sealing surface 58 of the grease cover 32 and the mating surface 64 of the first rotational member 42. What is needed, therefore, is a method and apparatus for sealing a grease cover with a CV joint. A favorable method would result in a predictable amount of sealing force on a gasket, such as the gasket 70.

SUMMARY

An embodiment of a constant velocity joint includes a rotational member having a generally cylindrical surface. The generally cylindrical surface is defined, at least in part, by a groove portion. The constant velocity joint further includes a grease cover selectively positioned adjacent the rotational member. An edge portion of the grease cover is positioned within the groove to at least partially retain the grease cover in a desired position.

Another embodiment provides a connection system for a grease cover of a constant velocity joint. The system includes a groove portion formed in a generally annular portion of the constant velocity joint. The generally annular portion is defined, at least in part, by an inner surface. The system also includes a grease cover selectively positioned at least partially within the groove portion. The grease cover includes an outer edge portion.

BRIEF DESCRIPTION OF THE DRAWINGS

The present invention will now be described, by way of example, with reference to the accompanying drawings. Components in the drawings are not necessarily to scale, emphasis instead being placed upon clearly illustrating the principles of the present invention. Although the drawings represent some embodiments, certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description. Moreover, in the drawings, like reference numerals designate corresponding parts throughout several views.

DETAILED DESCRIPTION

Referring to the drawings, exemplary constant velocity joints are shown. The illustrated constant velocity joints and joint chambers may be fixed constant velocity joints of the monoblock style that may be used in the propeller shaft (prop shaft) of a vehicle. It should be noted, however, that any type of constant velocity joints and constant velocity joint chambers, including without limitation, tripod, fixed tripod, or the like may be used in accordance with the present invention. That is, one of ordinary skill in the art will recognize the advantages realized by the invention in substantially all types of constant velocity joints, and, therefore the invention should not be limited to the illustrated embodiments.

Figure 2:
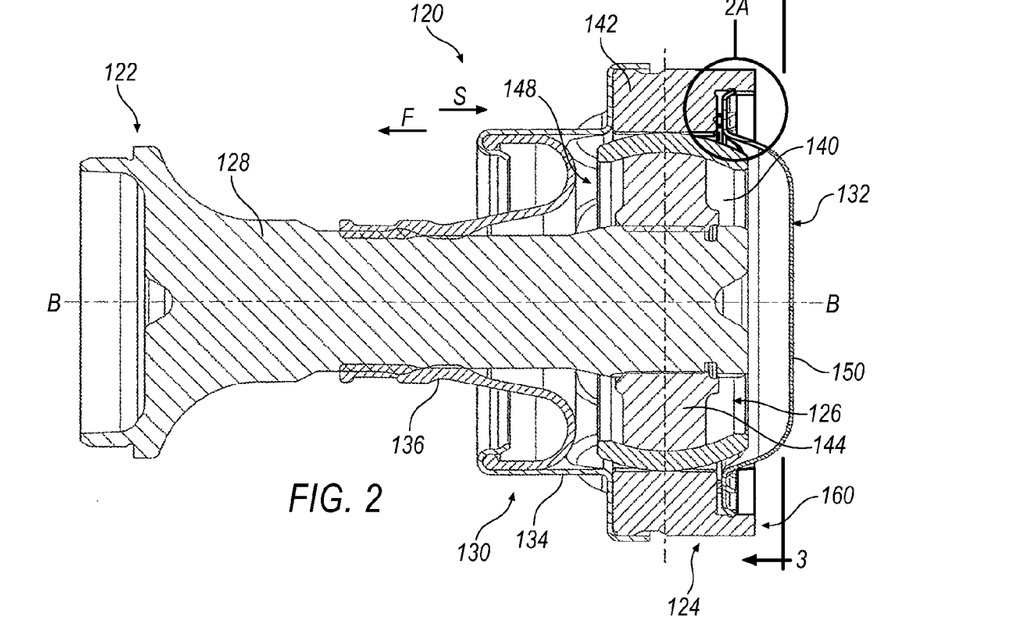
FIG. 2 is a sectional view of a constant velocity joint according to an embodiment.

FIG. 2 illustrates a CV joint 120 having a driven end 122 and a driving end 124, generally aligned along an axis B-B. CV joint 120 further includes a joint assembly 126 that is coupled to a shaft 128. A boot cover assembly 130 is connected between the joint assembly 126 and the shaft 128. Boot cover assembly 130 includes a metal cover 134 and a flexible boot 136. A cover member, or grease cover, 132 seals the driven end 122 of CV joint 120.

Joint assembly 126 includes a cage 140, a first rotational member or outer race 142, a second rotational member or inner race 144, and a plurality of balls (not shown). As illustrated, shaft 128 is splined to second rotational member 144.

Collectively, at least the shaft 128, boot cover assembly 130, and the first rotational member 142 form a joint chamber 148. The joint chamber 148 contains grease or other lubricant (not illustrated).

Figure 2A:
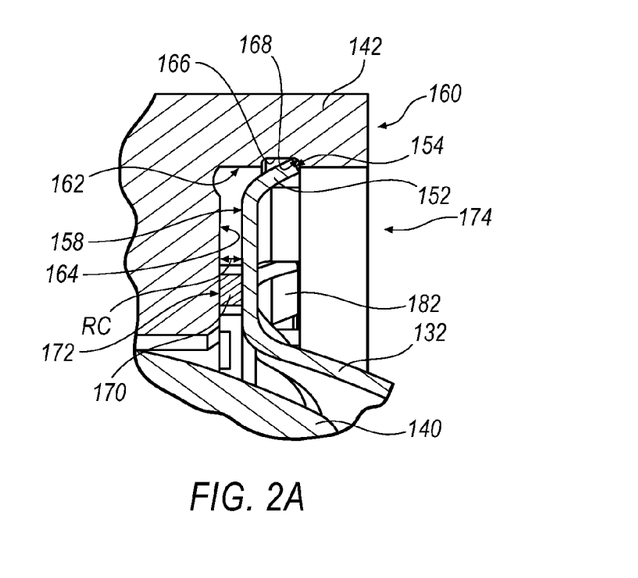
FIG. 2A is an enlarged view of area 2A of FIG. 2.
Figure 3:
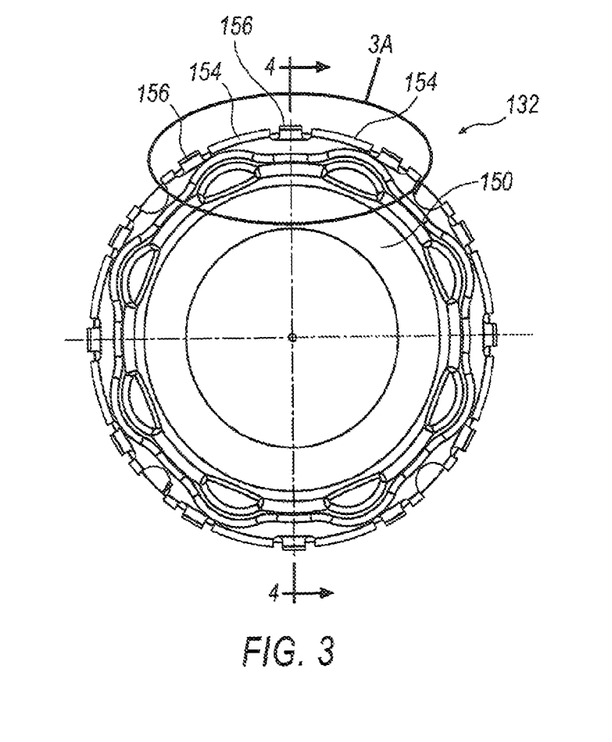
FIG. 3 is an end view of a grease cover taken along line 3-3 of FIG. 2.
Figure 3A:
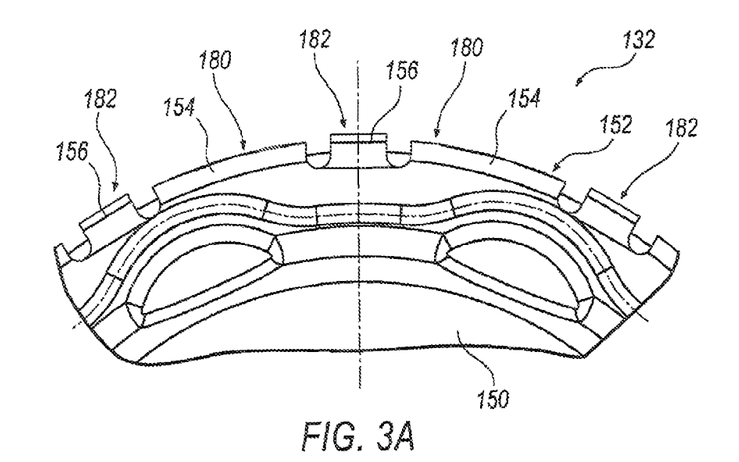
FIG. 3A is an enlarged view of area 3A of FIG. 3.

As best seen in at least one of FIGS. 2A, 3, and 3A, the grease cover 132 has a generally circular body 150 defined, at least in part, by a peripheral edge portion 152 defined, at least in part, by an end surface 154 and fingers 156, and a generally annular sealing surface 158.

As best seen in FIG. 2A, the first rotational member 142 has a grease cover end 160 having a generally cylindrical inner surface 162 and a generally annular mating surface 164. The inner surface 162 has an annular groove 166, defined by a groove surface 168, formed therein.

Figure 4:
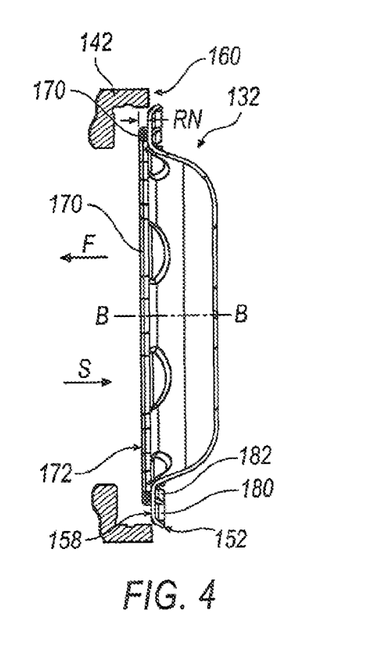
FIG. 4 is a side view the grease cover, taken along line 4-4 of FIG. 3.

In the embodiment illustrated in FIG. 4, a sealing member, or sealing ring, 170 is integrally molded on the sealing surface 158 of the grease cover 132. The sealing ring 170 extends generally between the sealing surface 158 and a distal surface 172.

The distal surface 172 of the sealing ring 170 seals against the mating surface 164 of the first rotational member 142, as discussed in greater detail below. FIG. 2A illustrates the sealing ring 170 in an installed, compressed configuration having a thickness of distance RC measured generally between the sealing surface 158 and the mating surface 164. FIG. 4 illustrates the sealing ring 170 in an uninstalled, uncompressed configuration having a thickness of distance RN measured generally between the sealing surface 158 and the distal surface 172.

The inner surface 162 and the mating surface 164 forms a recess 174 within the first rotational member 142. The inner surface 162, the mating surface 164 and the recess 174 are a portion of the joint chamber 148. Accordingly, the grease cover 132 seals at least a portion of the joint chamber 148.

As illustrated, fingers 156 of peripheral edge portion 152 include alignment fingers 180 and retaining fingers 182 that may differ in form and function, as discussed below, although other embodiments may include generally only one type of finger 156, or may include greater than two types of fingers 156. The peripheral edge portion 152 may be constructed of a resilient material for axially retaining the grease cover 132 relative to the first rotational member 142 and/or providing a desired value of compression on the sealing ring 170. In some embodiments, a portion of the edge portion is not positioned within the groove 166 formed in the inner surface 162.

As seen in FIG. 3A, the retaining fingers 182 define a larger outer diameter than the alignment fingers 180. That is, the retaining fingers 182 extend farther from the axis B-B of body 150 than the alignment fingers 180. As seen in FIG. 2A, at least the retaining fingers 182 extend into the groove 166, although the alignment fingers 180 may extend into the groove 166 in some embodiments. In some embodiments, at least a portion of the end surfaces do not contact the surface defining a portion of the groove portion.

An embodiment of coupling the grease cover 132 to the CV joint 120 is described as follows. The grease cover 132 is positioned coaxially and in axial alignment with the grease cover end 160 of the first rotational member 142 by a user, or operator (not shown), as best seen in FIG. 4. The grease cover 132 and the first rotational member 142 are then urged together, as the grease cover 132 is moved in a first direction F (which is generally parallel with the axis B-B) relative to the grease cover end 160, and the peripheral edge portion 152 of the grease cover 132 contacts the inner surface 162. The grease cover 132 is then further urged in the first direction F until the distal surface 172 of the sealing ring 170 contacts the annular mating surface 164.

The grease cover 132 is then further urged in the first direction F until the sealing ring 170 is compressed between the annular mating surface 164 and the sealing surface 158. As the sealing ring 170 is compressed, the retaining fingers 182 translate generally rectilinearly parallel to the axis B-B and extend axially to or beyond the groove surface 168 of the groove 166. A portion of the retaining fingers 182 may then resiliently extend into the groove 166. Preferably, at least a portion of the edge portion 152 extends radially and remains within at least a portion of the groove 166. An operator may audibly detect a 'snap' or feel a slight vibration through the cover 132 or other portions of the CV joint 120 as the retaining fingers 182 enter the groove 166. The operator may then reduce the urging force on the grease cover 132 and permit the grease cover 132 to move slightly in a second direction S (which is generally opposite the direction F and generally parallel with the axis B-B) until the end surfaces 154 of the retaining fingers 182 contact the groove surface 168, to axially position the grease cover 132 relative to the first rotational member 142 in an installed configuration (FIG. 2).

In the installed configuration, the sealing ring 170 is compressed generally to the thickness of distance RC, which is less than the distance RN. Accordingly, the sealing ring 170 may be compressed to a predetermined amount of axial compression in the installed configuration, as the distance RC is determined by predetermined parameters of the grease cover 132 and the first rotational member 142. Additionally, a predetermined amount of sealing force may be provided as the grease cover 132 is axially positioned relative to the first rotational member 142 since the amount of axial compression distance of the sealing ring may be determined for the materials used to construct the sealing ring 170. Therefore, the grease cover 132 may be positioned relative to the CV joint 120 while applying a predetermined amount of compression on the sealing ring 170.

Figure 5:
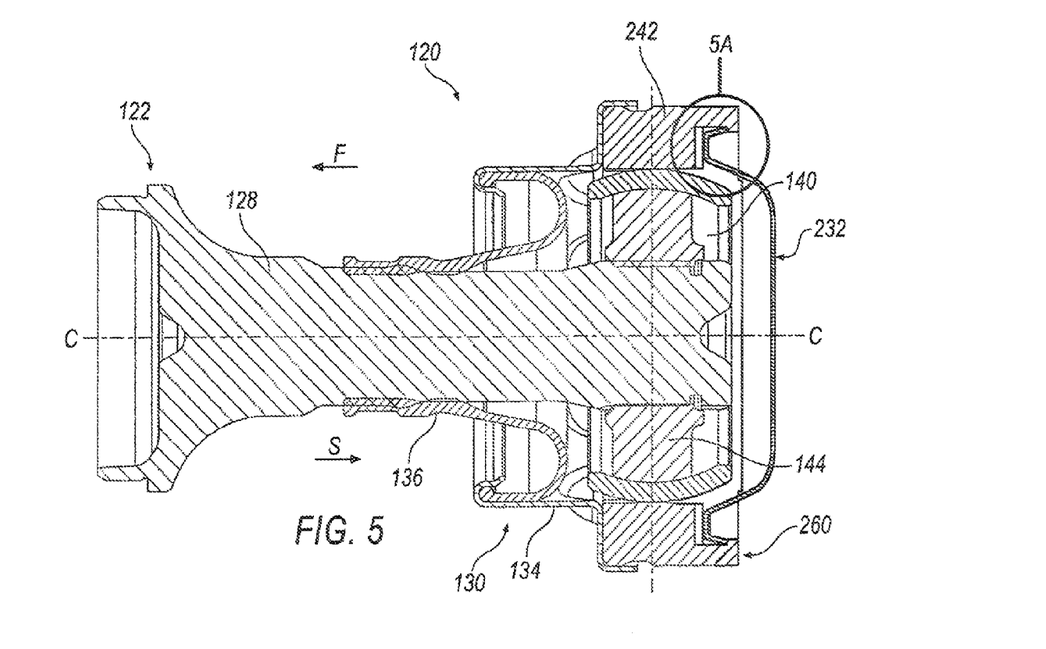
FIG. 5 is a sectional view of an embodiment of a constant velocity joint.
Figure 5A:
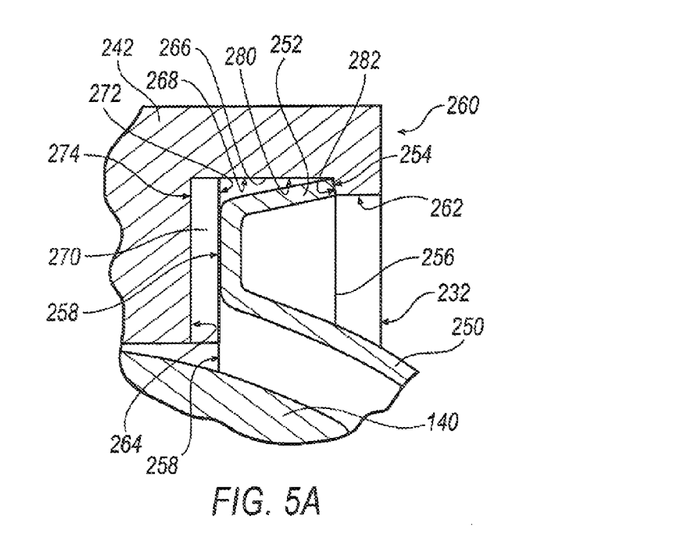
FIG. 5A is an enlarged view of area 5A of FIG. 5.

Referring to FIGS. 5 and 5A, an alternative embodiment of the grease cover 132 is illustrated as a grease cover 232. In the embodiment illustrated, the CV joint 120 includes a first rotational member 242.

The grease cover 232 has a generally circular body 250 defined, at least in part, by a peripheral edge portion 252, a generally annular end surface 254, an inner edge 256, and a generally annular sealing surface 258. The first rotational member 242 has a grease cover end 260 having a generally cylindrical inner surface 262 and a generally annular mating surface 264, generally defining a recess in the first rotational member 242. The inner surface 262 has an annular groove 266, defined by a groove surface 268, formed therein. In the embodiment illustrated, a sealing ring 270 is interposed between the grease cover 232 and the first rotational member 242. The sealing ring 270 is defined, at least in part, by a generally annular first surface 272 and a generally annular second surface 274. The first surface 272 is in contact with the sealing surface 258 of the grease cover 232. The second surface 274 seals against the mating surface 264 of the first rotational member 242, as discussed below.

In the embodiment illustrated, the groove surface 268 is defined by a generally cylindrical surface 280 and a generally frusto-conical surface 282. As best illustrated in FIG. 5A, the generally frusto-conical surface 282 is bindingly in contact with the end surface 254 of the grease cover 232 when the grease cover 232 is in an installed configuration.

Figure 7:
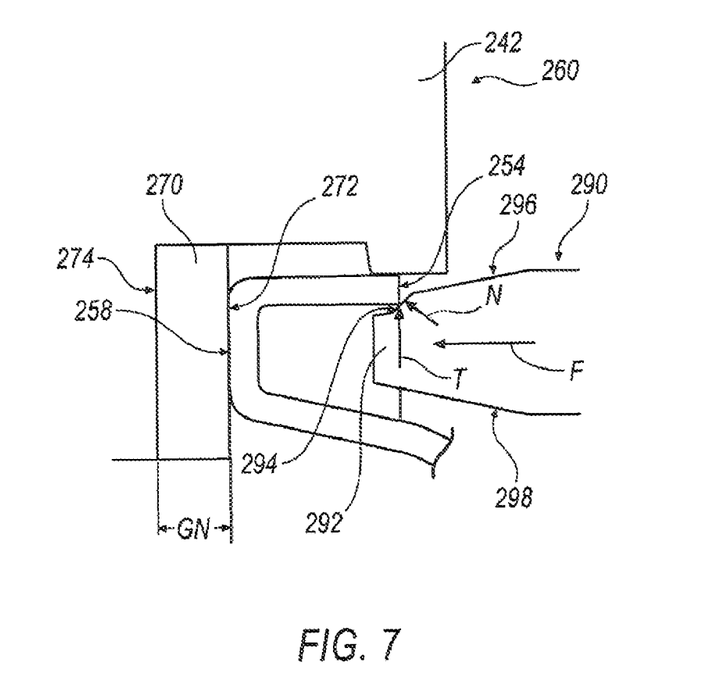
Figure 9:
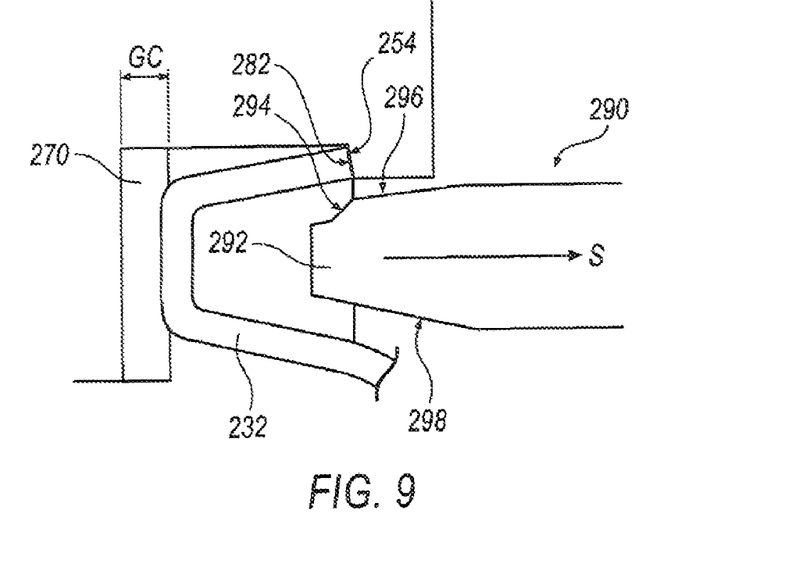

As seen in a comparison of FIGS. 7 and 9, the end surface 254 may define a generally annular surface (FIG. 7) or a generally frusto-conical surface (FIG. 9), depending on the configuration of the grease cover 232, although other embodiments may include other annular configurations for the end surface 254. Preferably, the end surface 254 is a generally continuous surface around the periphery of the grease cover 232, although embodiments may include a non-continuous surface.

Figure 8:
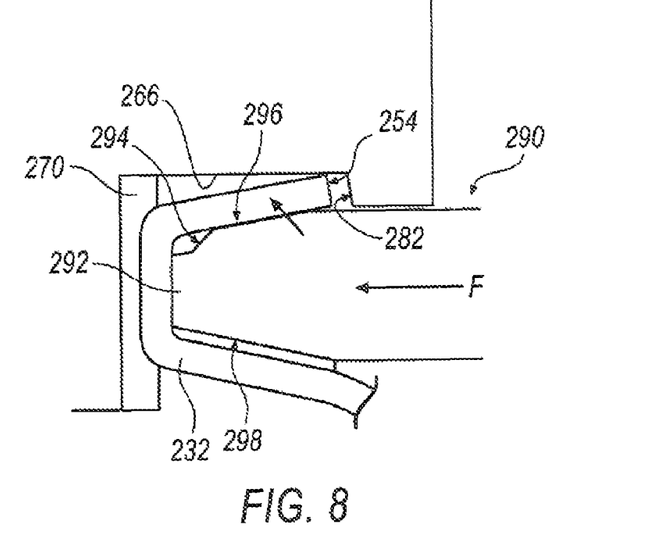

As seen in FIGS. 7-9, an insertion tool 290 is used to install the grease cover 232. The insertion tool 290 has a generally annular mating end 292 defined, at least in part, by a generally frusto-conical guiding surface 294, a generally frusto-conical expanding surface 296, and an inner support surface 298. In the embodiment illustrated, the insertion tool 290 is a body of rotation (of the section shown) generally about an axis C-C (see FIG. 5), although other embodiments of the insertion tool 290 may be formed of a radially segmented body of rotation.

Figure 6:
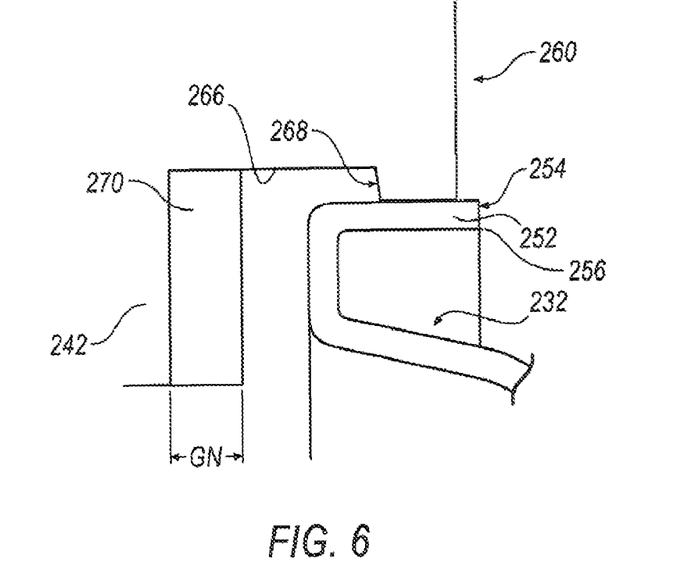
FIGS. 6-9 are sectional views of the portion of the CV joint of FIG. 5A, illustrated in various steps of assembly with section lines omitted for clarity.

A method of coupling the grease cover 232 to the CV joint 120 is as follows. The grease cover 232 is positioned coaxially and in axial alignment with the grease cover end 260 of the first rotational member 242, as may be seen in FIG. 6. The grease cover 232 and the first rotational member 242 are then urged together, as the grease cover 232 is urged in the first direction F relative to the grease cover end 260, and the peripheral edge portion 252 of the grease cover 232 contacts the inner surface 262.

As seen in FIG. 7, the insertion tool 290 may then be positioned such that the guiding surface 294 is in contact with the inner edge 256. The insertion tool is then guided generally along the axis C-C toward the shaft 128 (FIG. 5). The grease cover 232 is then further urged in the first direction F until the sealing ring 270 contacts the sealing surface 258. As illustrated, moving the insertion tool 290 in the direction F results in the guiding surface 294 acting on the inner edge 256 of the grease cover 232 with a normal force N that provides a radial force (represented by radial vector T) on the inner edge 256. Thus provided, the insertion tool 290 may guide the grease cover 232 into a desired position relative the first rotational member 242 while urging the edge portion 252 radially outward, generally in the direction of tangential vector T.

The grease cover 232 is then further urged in the first direction F until the sealing ring 270 is compressed and the end surface 254 is urged beyond the frusto-conical surface 282, as best seen in FIG. 8. As the end surface 254 is urged beyond the frusto-conical surface 282, the guiding surface 294 of the insertion tool 290 urges the edge portion 252 radially outward, due to the radial force represented by radial vector T, as a portion of the edge portion 252 extends into the groove 266. As the inner edge 256 is expanded beyond the guiding surface 294, the insertion tool 290 may then move toward the sealing surface 258 such that the expanding surface 296 further deforms the end portion 252 and end surface 254 radially away from the axis C-C (FIG. 8).

With specific reference to FIG. 9, the insertion tool 290 may then be removed from the CV joint 120 as follows. The insertion tool 290 is urged in the second direction S as the sealing ring 270 resiliently expands between the sealing surface 258 and the mating surface 264. The insertion tool 290 is further urged in the second direction S until at least a portion of the end surface 254 contacts at least a portion of the groove surface 268. Preferably, the end surface 254 bindingly contacts the frusto-conical surface 282. The insertion tool 290 is then further urged in the direction S until there is no contact between the insertion tool 290 and the first rotational member 242 and the grease cover 232.

At least a portion of the edge portion 252 extends radially outward in the installed configuration of FIG. 5, and remains within at least a portion of the groove 266. When the grease cover 232 is in the installed configuration, as illustrated in FIGS. 5, 5A, and 9, the sealing ring 270 is compressed generally to the thickness of distance GC, which is less than the distance GN (uncompressed thickness of the sealing ring 270) illustrated in FIG. 6. Accordingly, the sealing ring 270 may be compressed to a predetermined amount of axial compression in the installed configuration, as the distance GC is determined by predetermined parameters of the grease cover 232 and the first rotational member 242. Additionally, the sealing ring 270 may be integrally molded onto the sealing surface 258 of the grease cover 232.

The material for grease covers 132, 232 is preferably a metallic material, and may be spring metal or a zinc plated low carbon steel. The grease covers 132, 232 may also be a plastic, nylon or any non-metallic material surrounded in a metallic outer peripheral edge portion 152, 252.

In an embodiment, the insertion tool 290 may be used to insert either the grease cover 232 or the grease cover 132, as desired. When inserting a grease cover 132, the insertion tool may be used as described herein to urge the grease cover 132 into a desired position and urge the retaining fingers 182 radially outward to engage the groove 166.

Although the grooves 166, 266 are illustrated as being generally continuous within the surfaces 162, 262, the grooves 166, 266 may not be continuous, but may include groove portions that selectively engage portions of the grease cover 132, 232 to retain the grease cover 132, 232 in a desired position.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A constant velocity joint comprising:
a rotational member having a generally cylindrical surface, wherein the generally cylindrical surface is defined, at least in part, by a groove portion;
a grease cover selectively positioned adjacent the rotational member, wherein at least a portion of a peripheral edge portion of the grease cover is positioned within the groove to at least partially retain the grease cover in a desired axial position relative to the rotational member; and
a plurality of fingers extending from the peripheral edge portion of the grease cover, wherein the plurality of fingers includes a first finger having a greater diameter than a second finger and wherein the peripheral edge portion defines a circumference of the grease cover.

2. The constant velocity joint of claim 1, wherein the groove portion extends generally radially outward from the cylindrical surface and the cylindrical surface is an interior surface forming at least a portion of a recess within the rotational member, and wherein at least a portion of the grease cover is interposed within the recess.

3. The constant velocity joint of claim 1, wherein each finger is defined, at least in part, by an end surface, and at least a portion of the end surfaces bindingly engage at least a portion of a surface defining a portion of the groove portion to retain the grease cover in a desired axial position relative to the rotational member.

4. The constant velocity joint of claim 3, wherein at least a portion of the end surfaces do not contact the surface defining a portion of the groove portion.

5. The constant velocity joint of claim 1, wherein the groove portion is a generally continuous groove.

6. The constant velocity joint of claim 1, wherein a portion of the edge portion is not positioned within the groove.

7. The constant velocity joint of claim 1, wherein a plurality of annular surface portions of the grease cover bindingly contact a surface portion of the groove to axially retain the grease cover relative to the rotational member.

8. The constant velocity joint of claim 1, further including a sealing ring integrally molded to a sealing surface of the grease cover.

9. The constant velocity joint of claim 1, wherein the first finger is a retaining finger and the second finger is an alignment finger.

* * * * *